United States Patent Office 2,982,101
Patented May 2, 1961

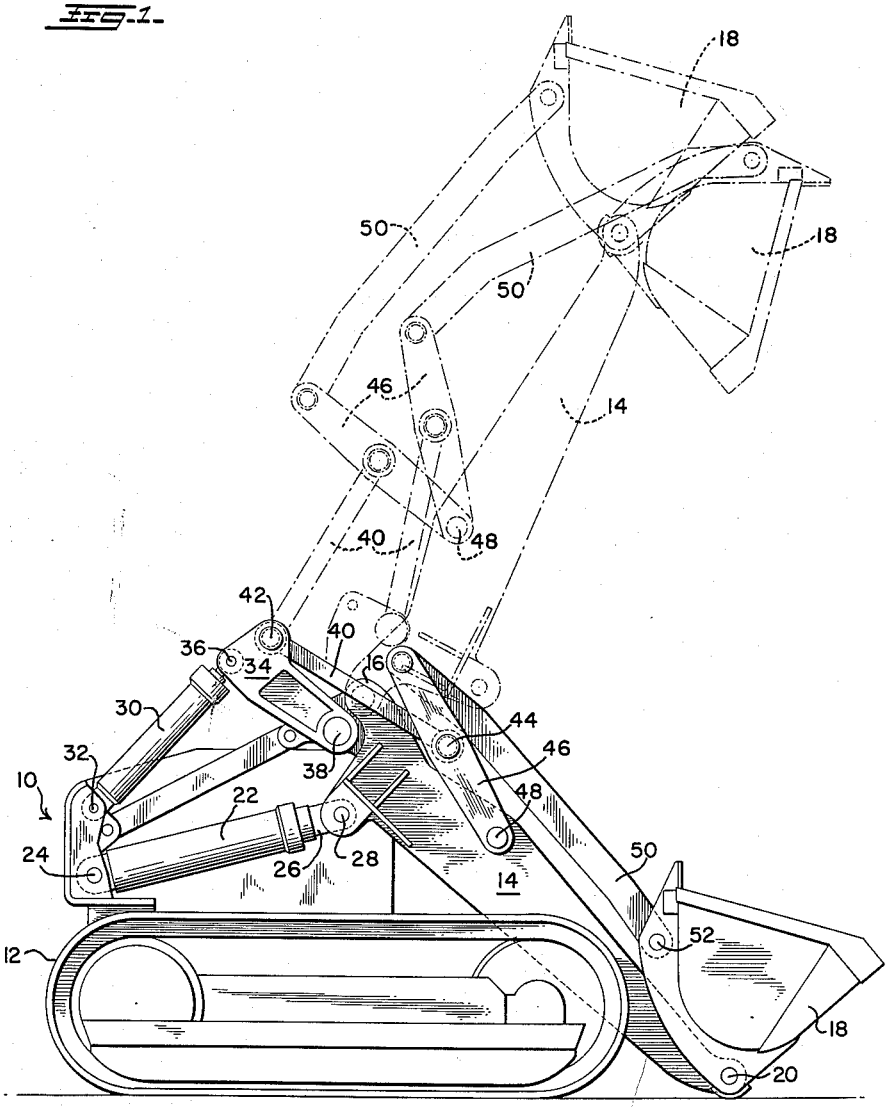

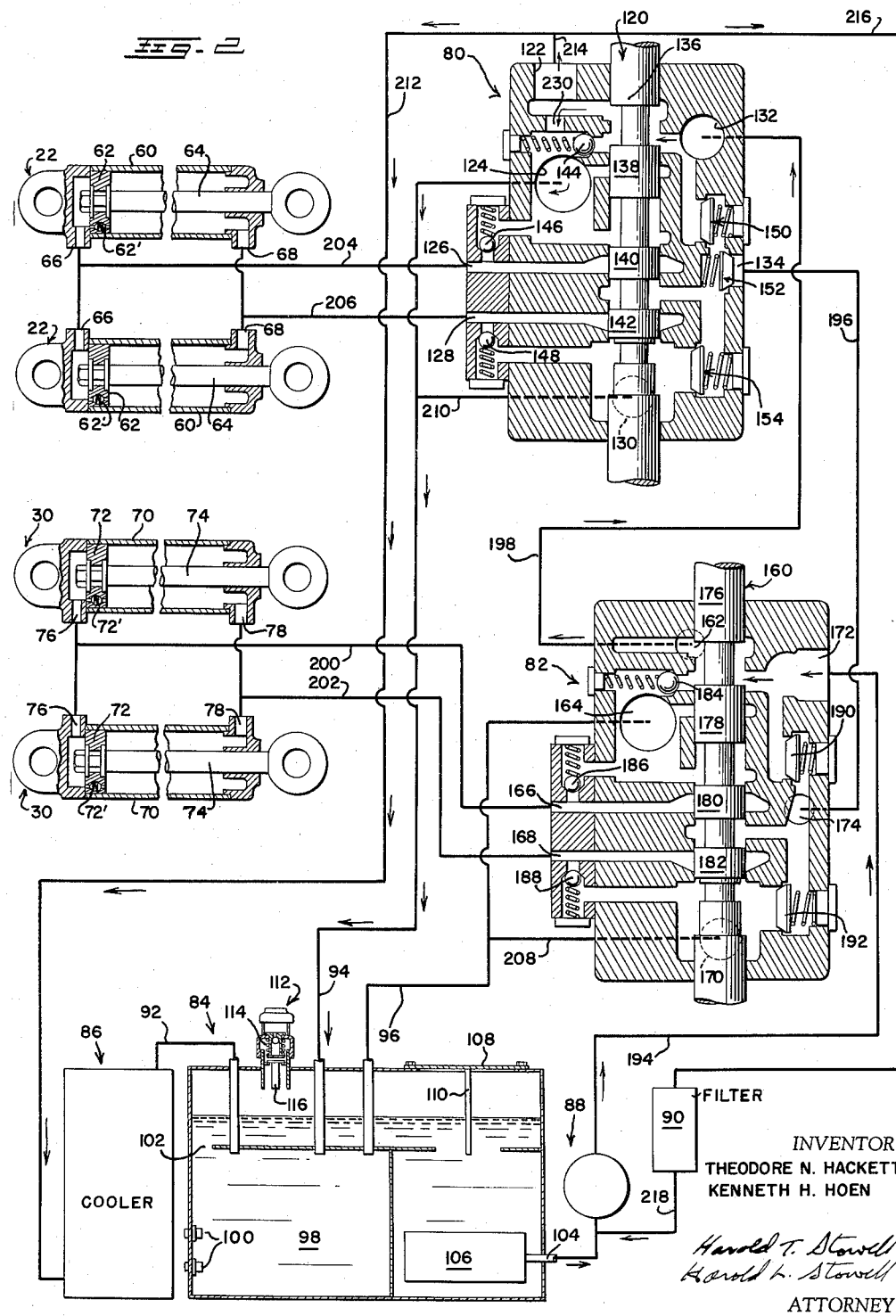

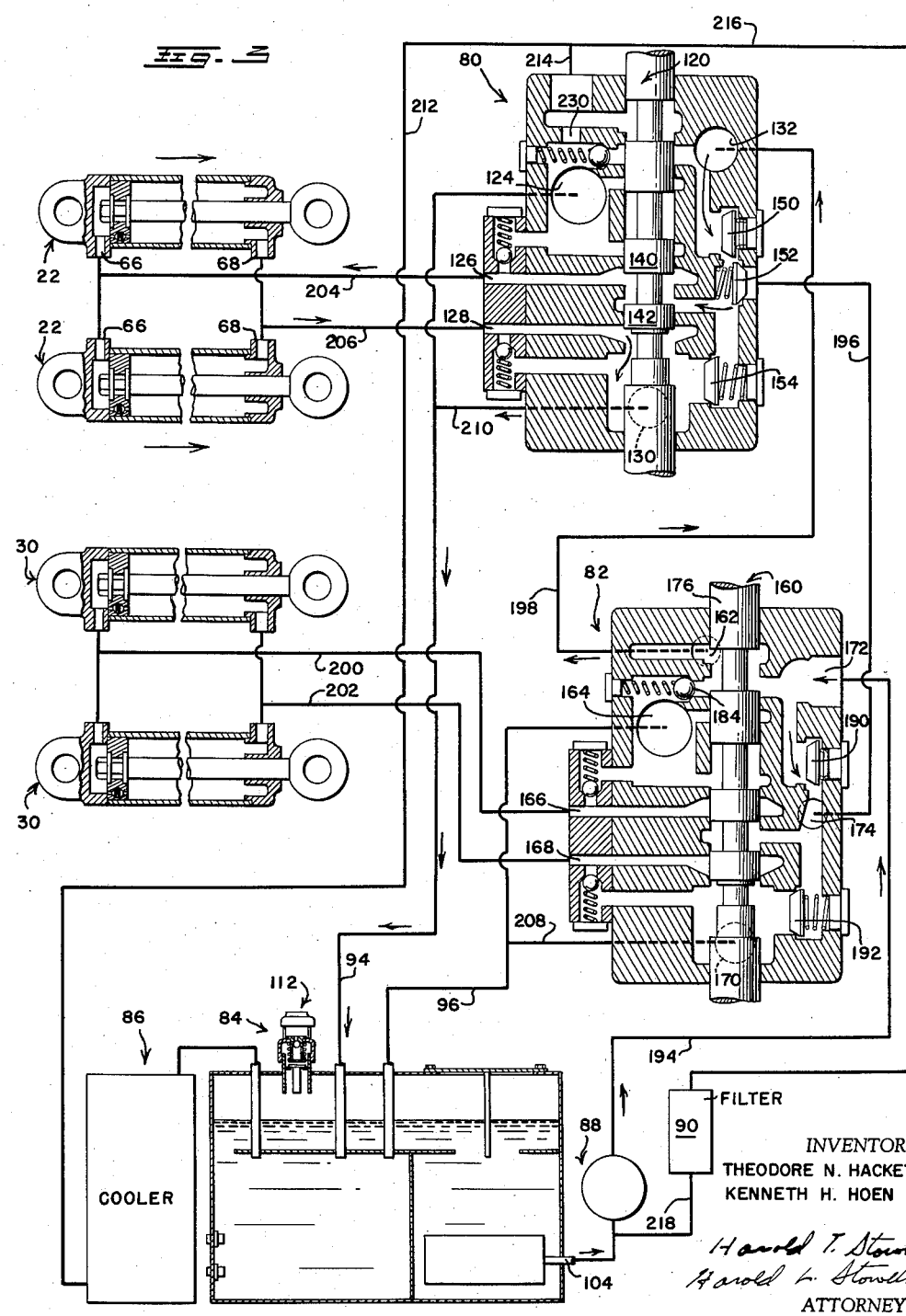

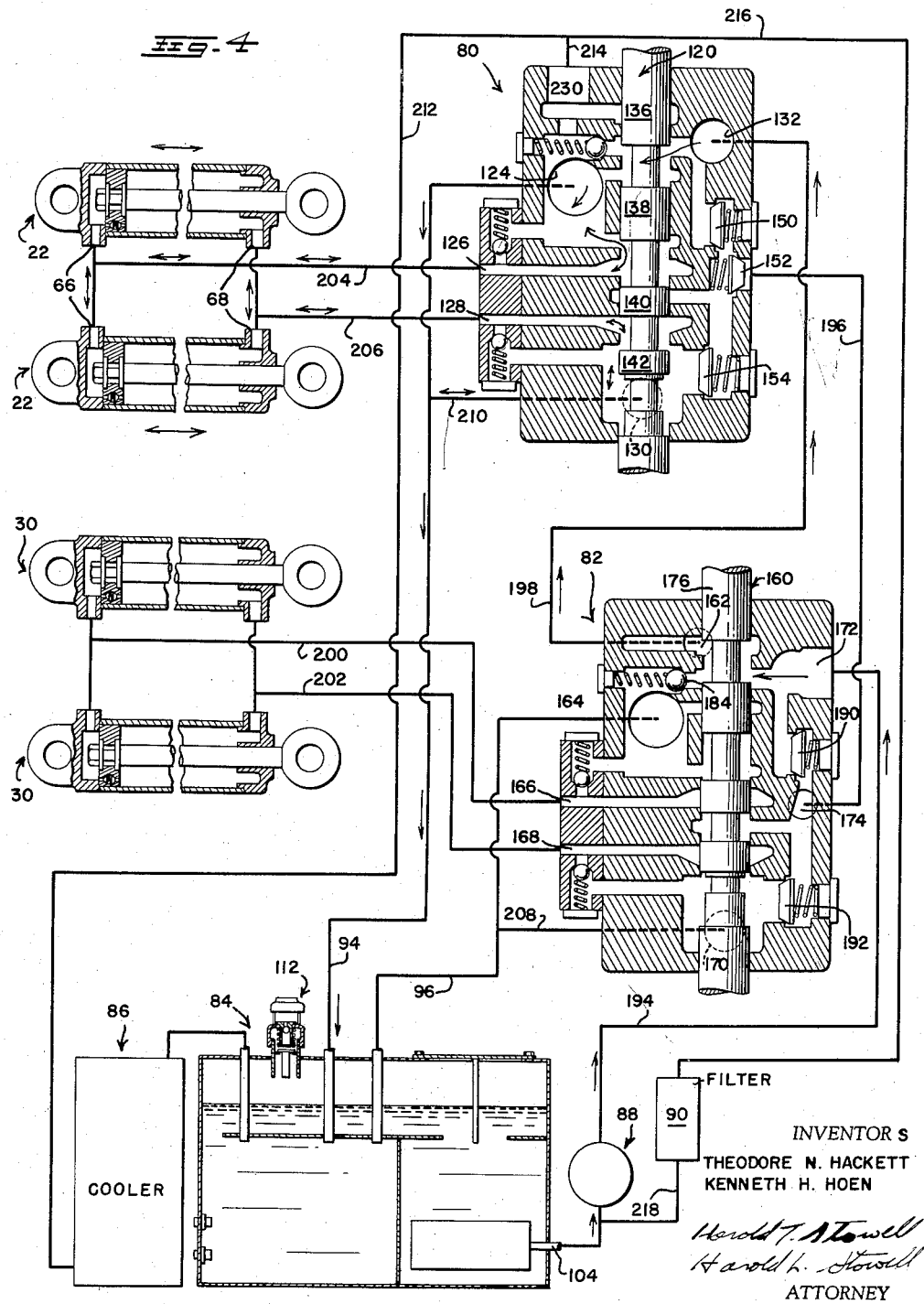

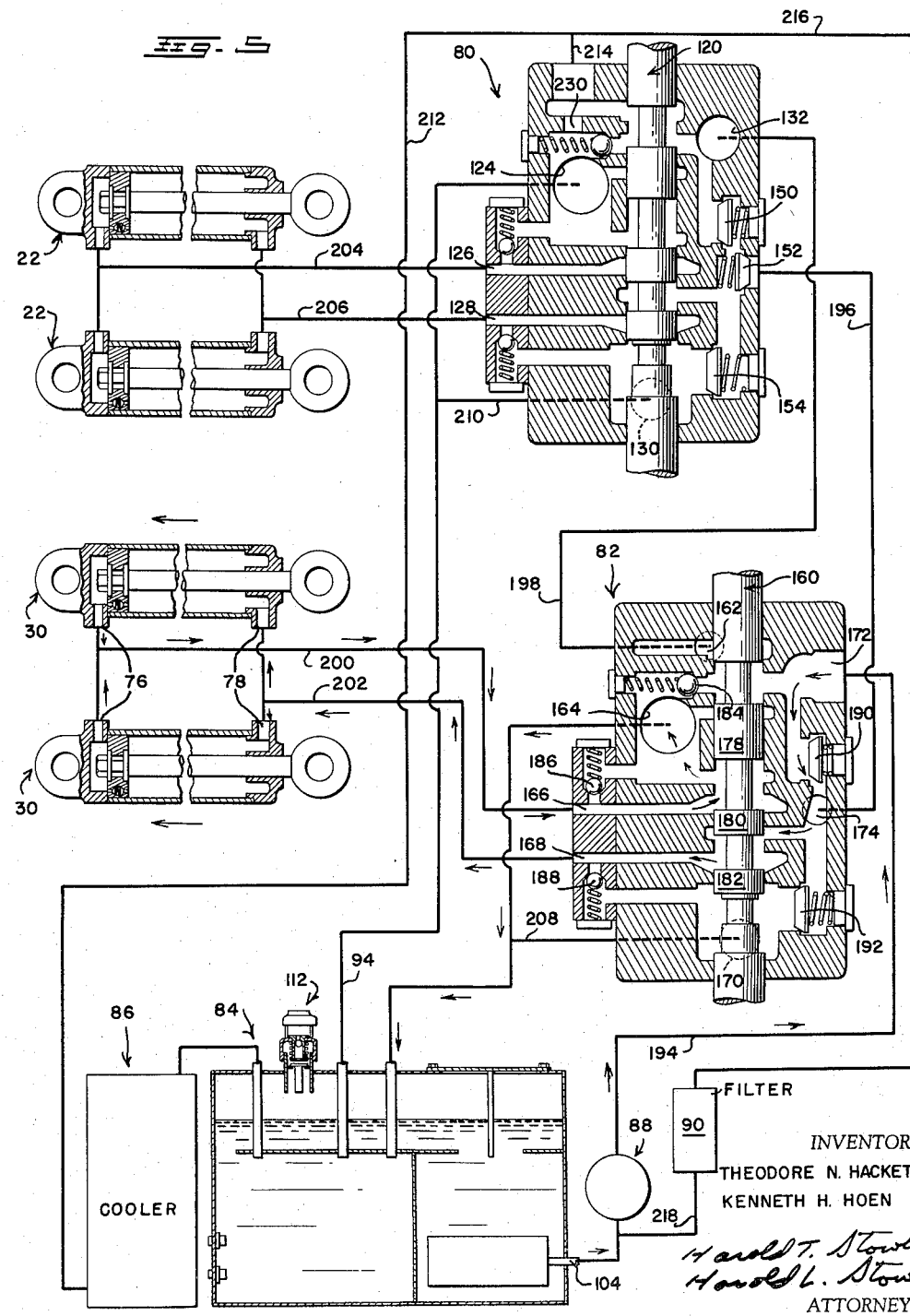

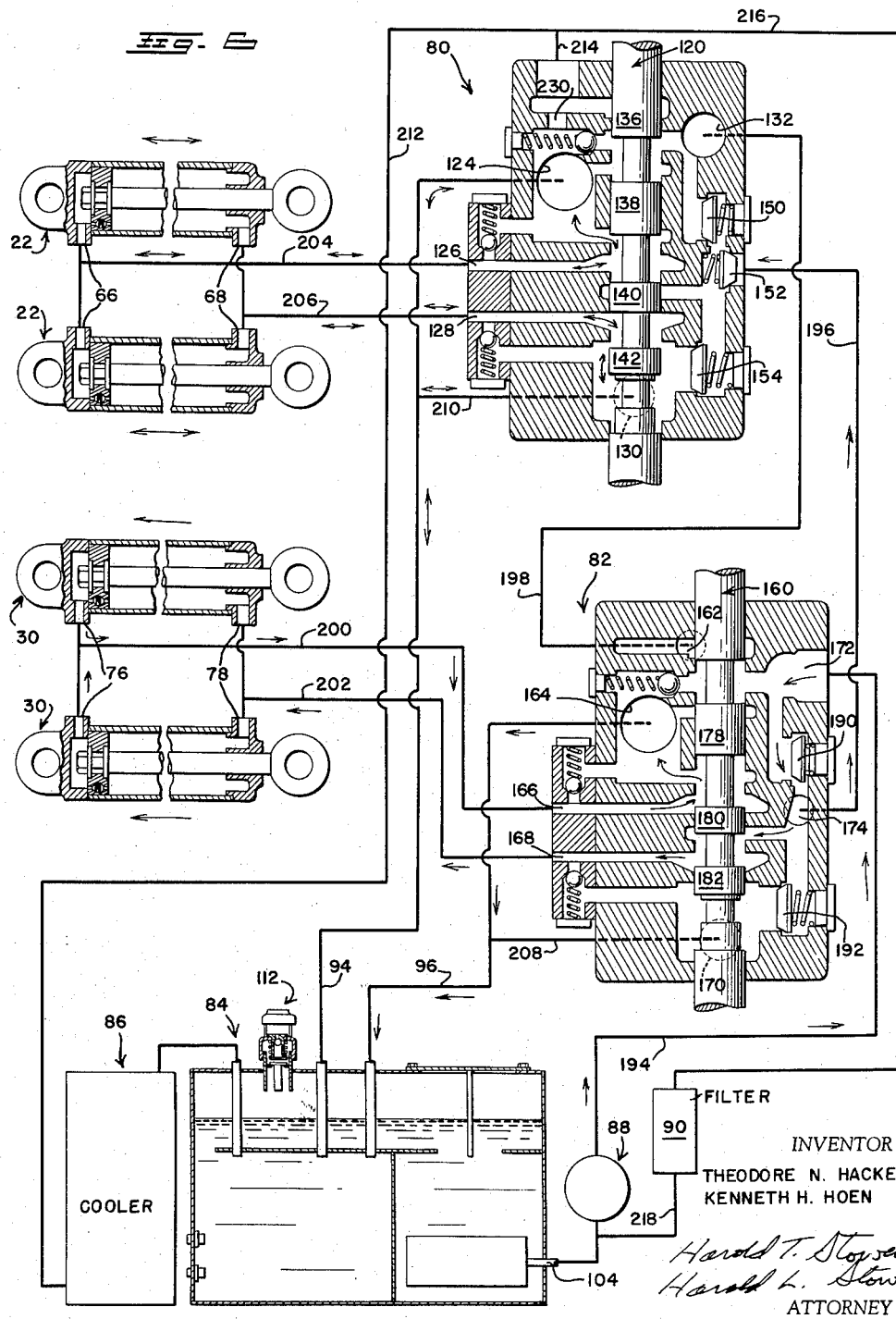

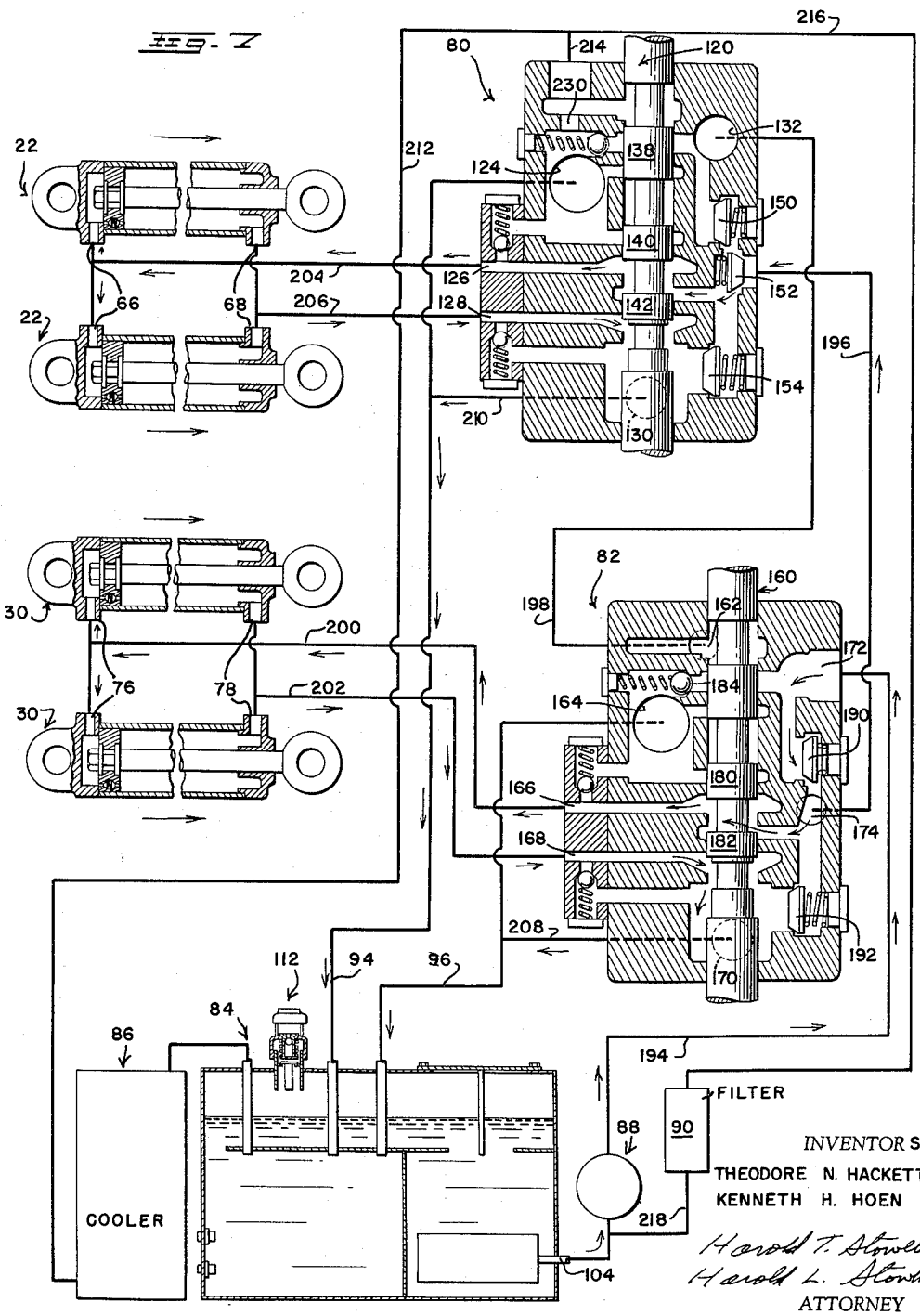

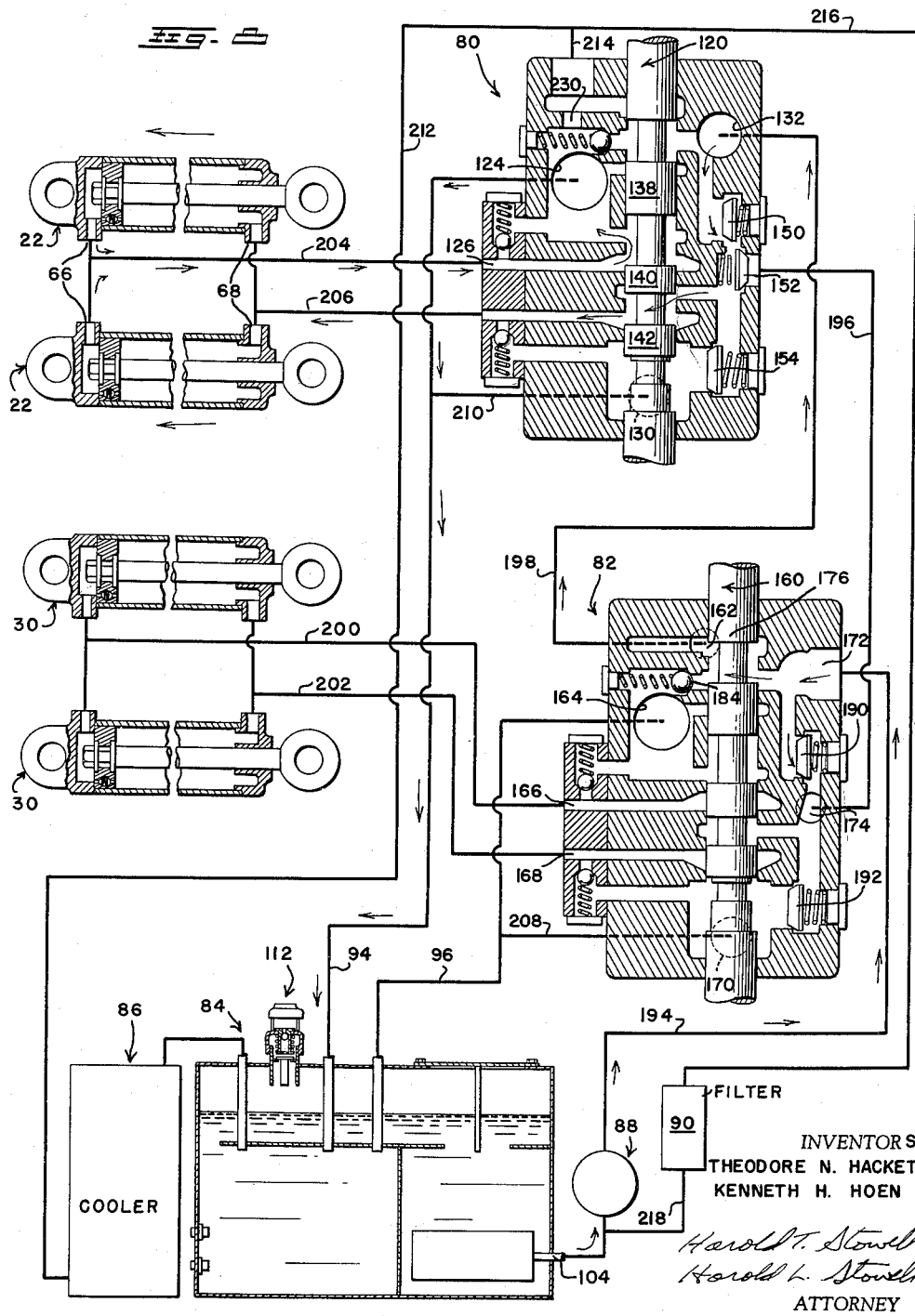

2,982,101

PRESSURE FLUID CONTROL SYSTEM

Theodore N. Hackett, Salt Lake City, Utah, and Kenneth H. Hoen, Billings, Mont., assignors to The Eimco Corporation, Salt Lake City, Utah, a corporation of Delaware Filed Dec. 5, 1957, Ser. No. 700,821

7 Claims. (Cl. 60—52)

This invention relates to a pressure fluid control system and, more particularly, to a system wherein plural motion devices are operable simultaneously or selectively from a single source of pressure fluid.

It is an object of the present invention to provide a pressure fluid control system for plural motion devices wherein each of the motion devices is connected to a control valve having a selectably movable valve spool and each of the valves are connected in series and in parallel relationship to a single source of pressure fluid.

A further object is to provide such a system including check valves for maintaining the motion devices at their instantaneous positions upon failure of the source of pressure fluid; and further check valves preventing overloads in the system.

Another object is to provide a pressure fluid control system including means for directing a predetermined portion of the pressure fluid to coolers and/or filters during predetermined portions of the operating cycle.

The invention will be more particularly described and other objects and advantages of the system will become apparent from a detailed description of the invention as applied to a front end loading device for a mobile material handling machine having two motion devices operable simultaneously or selectively which includes a control valve having a movable spool means for each motion device, a pump and a source of fluid including conduit means connecting one of the valves to the pressure side of the pump, conduit means connecting said one valve through its spool means to one of the motion devices, conduit means connecting the other of said valves through its spool means to the other of the motion devices, a first conduit connecting the pressure fluid in said one valve to the other valve through the spool means of said one valve, and a second conduit connecting the pressure fluid in said one valve to the other valve and bypassing the spool means in said one valve whereby said valves are selectively connected in series or in parallel relationship.

The principles of the invention will be more readily apparent to those skilled in the art from the following detailed description and the accompanying drawings wherein:

Fig. 1 is a side elevational view of a front end loading machine incorporating the features of the invention; and Figs. 2 through 8 are diagrammatic views of the hydraulic control system of the present invention with the valve means in various operating positions.

Referring to Fig. 1 of the drawings, 10 generally designates a mobile material handling machine mounted on conventional crawler treads 12. The material handling machine includes a front end loading structure having a boom 14 which is pivotally mounted at 16 to the superstructure of the vehicle. At the other end of the boom 14 is a shovel bucket 18 which is pivotally mounted to the boom as at 20. The boom is pivoted from its low forward position shown in solid line to an upwardly extended position as shown in dotted lines by a hydraulic ram or cylinder 22.

The hydraulic ram 22 is pivotally mounted to the main frame of the vehicle as at 24 while the extended end of piston rod 26 of the ram is pivotally connected as at 28 to the boom 14 below the boom's pivotal connection to the frame of the vehicle.

The front end loading structure also includes means for pivoting the bucket 18. The means for pivoting the bucket includes a hydraulic ram 30 which is pivotally connected to the frame of the vehicle as at 32 and to a bell-crank 34 by pivot pin 36. The bell-crank is also pivoted as at 38 to the boom 14, and to an arm 40 as at 42.

The other end of the arm 40 is center connected as at 44 to a cross-arm 46. One end of the cross-arm is pivoted as at 48 to the boom 14 while the other end is pivotally mounted to a linkage 50, the lower end of which is pivoted as at 52 to the bucket 18 at a point spaced from the pivotal connection 20 of the bucket to the boom 14.

An identical system of boom, lever arms, bell-cranks, linkages, and hydraulic rams is provided for the other side of the material handling machine, as is well known in the art, whereby upon directing pressure fluid into the hydraulic rams 22 the booms 14 are pivoted about the axes of pivot shafts 16 and raised to the extended position as shown in dotted lines in Fig. 1 of the drawings. By directing pressure fluid to the hydraulic rams 30, the bucket 18 is pivoted about the axes of pivot shafts 20 for scooping material, when the arm is in the low position as shown in solid lines, or for dumping the bucket as shown in phantom lines when the boom is in the extended upwardly directed position.

The control means for actuating the pair of hydraulic rams 22 and the pair of hydraulic rams 30 will be described with references to Figs. 2 through 8 with reference numerals corresponding to those of Fig. 1.

Referring to Figs. 2 through 8, the hydraulic rams 22 for the booms 14 include cylinders 60 having pistons 62 slidably mounted therein, piston rods 64, and pressure fluid inlet and outlet ports 66 and 68 at the extended ends of the cylinders. Each of the pistons 62 is also provided with relief valves 62' so that when a piston reaches the end of its stroke, pressure is relieved past the piston and the motion of the piston is stopped. The relief valves 62' are known in the art and form no part of the present invention.

The hydraulic rams 30 for pivoting bucket 18 includes cylinders 70 provided with pistons 72 slidably mounted therein, piston rods 74 and inlet and/or outlet ports 76 and 78. Each of the pistons 72 of the hydraulic rams 30 includes a relief valve 72' as discussed with reference to the relief valves 62' of hydraulic rams 22.

The hoist rams 22 are connected to a control valve 80 and the bucket dump rams 30 are connected to a control valve 82. The system also includes a reservoir for hydraulic fluid 84, a cooler for hydraulic fluid 86, a pump 88 and a filter 90.

Referring particularly to the reservoir 84 for the hydraulic fluid, it will be seen that the reservoir includes a return line 92 from the cooler 86, a return line 94 from valve 80 and a return line 96 from valve 82. Each of the return lines 92, 94, and 96 discharge into a settling chamber 98 within the reservoir 84.

Within the settling chamber 98 are one or more, two being specifically shown, permanent magnets 100 which remove particles of tramp iron and other magnetic susceptible materials from the hydraulic fluid flowing into the settling chamber 98. The settling chamber 98 communicates with the remainder of the tank through an opening 102. Hydraulic fluid leaves the reservoir 84 through a conduit 104 which communicates with the hydraulic fluid in the reservoir 84 through one or more strainers 106. The reservoir is provided with a removable cover 108 provided with a dipstick 110 for determining the height of the hydraulic fluid within the reservoir. It will be noted that the removable inspection plate 108 is positioned vertically above the strainers 106 whereby the strainers may be readily removed for cleaning or replacement.

Hydraulic fluid is added to the reservoir through an inlet 112 provided with a spring-urged ball check 114 for maintaining within the reservoir a slight pressure. By maintaining a slight pressure within the reservoir at all times, the possibility of dirt filtering into the system is greatly minimized. Further, the filler neck is provided with a fine mesh screen 116 for filtering the hydraulic fluid added to the system and to minimize the entry of foreign material to the system when the filter cap is removed for the purposes of adding fluid to the system.

Control valve for hoist cylinders

Control valve 80 for the hoist cylinders 22 is provided with the following ports through which the flow of hydraulic fluid is controlled by spool 120, 122, 124, 126, 128 and 130. Valve 80 is also provided with two inlet ports for pressure fluid 132 and 134.

Valve spool 120 for controlling the flow of pressure fluid within valve 80 is provided with four control surfaces designated 136, 138, 140 and 142. To complete the valve structure within the valve body are three spring-urged ball-checks generally designated 144, 146 and 148; and three flow control spring-urged valves 150, 152 and 154.

Bucket cylinder control valve

The bucket dump cylinder control valve 82 is provided with a control spool generally designated 160 and is provided with the following ports controlled by said valve spool: 162, 164, 166, 168 and 170. The valve is also provided with a pressure fluid inlet port 172 and a further outlet port 174. The valve spool 160 has four port control surfaces designated 176, 178, 180 and 182. Valve 82, like valve 80, is also provided with three spring-urged ball-check members designated 184, 186 and 188. Valve 82 is further provided with two pressure-sensitive flow control valves 190 and 192.

Control valves 80, 82, cylinders 22 and 30, cooler 86, fluid pressure reservoir 84, pump 88 and filter 90 are interconnected as follows:

Conduit 104 from the reservoir 84 is connected to the inlet side of pump 88 while the outlet port of pump 88 is connected by conduit 194 to port 172 of valve 82.

Port 174 of valve 82 is connected to port 134 of valve 80 by conduit 196.

Port 162 of valve 82 is connected to port 132 of valve 80 by conduit 198.

Ports 76 of dump cylinders 30 are connected to port 166 of valve 82 by conduit 200.

Ports 78 of dump cylinders 30 are connected to port 168 of valve 82 by conduit 202.

Port 66 of hoist cylinders 22 are connected to port 126 by conduit 204 while port 68 of hoist cylinders 22 are connected to port 128 of valve 80 by conduit 206.

Drain port 164 is connected to the reservoir 84 by conduit 96 while drain port 170 of valve 82 is also connected to conduit 96 by branch line 208.

Drain port 124 of valve 80 is connected to the reservoir 84 through conduit 94 while drain port 130 of valve 80 is connected to conduit 94 by branch line 210.

Hydraulic fluid cooler 86 is connected to valve port 122 of valve 80 by conduit 212 and conduit 214.

Filter 90 is connected at the junction of conduits 212 and 214 by a restricted line 216. The other side of of filter 90 is connected to conduit 104 adjacent the inlet to pump 88 by line 218.

Valve 80 controlling the hoist cylinders 22 is a four-position valve and for the purposes of the illustrative embodiments of the invention the four positions will be designated:

(1) "Blocked" whereby pressure fluid is blocked from flowing to and from the cylinders as shown in Figs. 2 and 5.

(2) "Hoist" whereby the bucket is lifted and hydraulic fluid flows to the cylinders via conduit 204 and returns to the valve via the conduit 206 as shown in Figs. 3 and 7.

(3) "Float" whereby the pistons may move in either direction within the cylinders 60 of hydraulic rams 22 as shown in Figs. 4 and 6.

(4) "Lower" whereby the booms supporting the bucket are lowered from their elevated positions and hydraulic fluid is directed to the cylinders through conduit 206 and returned to the valve from the cylinders by conduit 204 as shown in Fig. 8.

For the purposes of illustration, valve 82 for the dump cylinders is of the three-position type which will be generally designated:

(1) "Hold" whereby the piston is maintained in a predetermined position and there is no flow of pressure fluid in conduits 200 and 202 as shown in Figs. 2, 3, 4 and 8.

(2) "Rollback" whereby pressure fluid is directed to the cylinders by conduit 202 and pressure fluid is directed from the cylinders by conduit 200 as shown in Figs. 5 and 6.

(3) "Dump" wherein pressure fluid is directed to the dump cylinders through conduit 200 and pressure fluid from the cylinders is returned to the valve 82 through the conduit 202 as shown in Fig. 7.

Operation

Referring specifically to Fig. 2 of the drawings, both of the valves 80 and 82 have their valve spools 120 and 160 respectively in the "hold" position. Referring specifically to valve 82 of Fig. 2 with the pump 88 operating, pressure fluid is directed from the reservoir 84 to the pump through conduit 104 and to the port 172 of valve 82 through conduit 194. With the spool 160 in the "hold" position, control surface 178 blocks passage of pressure fluid to port 164; control surface 180 blocks flow of pressure fluid through port 166; and control surface 182 blocks the flow of pressure fluid through port 168 and spring-urged control valve 192 prevents the flow of pressure fluid through port 170. Therefore, the pressure fluid entering valve 82 through port 172 flows out of port 162 into conduit 198 to port 132 of valve 80. Now, referring to valve 80 as shown specifically in Fig. 2 of the drawings, since this valve is shown also in the "hold" position, control surface 138 prevents flow of pressure fluid through port 124; control surface 140 prevents flow of pressure fluid from port 126; and control surface 142 prevents the flow of pressure fluid through port 128. Similarly, spring-urged control valve 154 prevents the flow of pressure fluid through cross passage 130. Therefore, as the pressure fluid entering valve 80 through port 132 flows toward port 122 and into conduit 214, a portion of the pressure fluid entering conduit 214 flows down the conduit 212 through the hydraulic fluid cooler 86 and into the reservoir through conduit 92. A further portion of the pressure fluid entering conduit 214 flows through the restricted conduit 216 to the filter 90 and from the filter 90 to the pump via lines 218 and conduit 104.

It will also be seen that a small restricted internal passage 230 has communication with port 124 and conduit 94 whereby a portion of the pressure fluid entering valve 80 through inlet port 132 is returned directly to the reservoir 84.

In the preferred arrangement of the valves in the "hold" position approximately one-half of the pump delivery goes through port 122, conduits 214 and conduits 212 to the cooler 86 with a small portion thereof passing in the restricted conduit 216 to the filter 90. The remainder of the flow of pressure fluid passes through the internal passage 230 out port 124 and to the reservoir through conduit 94. This division of flow results from the difference in areas of the outlet ports 122 and the internal passage 230 and the back pressure created by having the pressure fluid turn abruptly in passing through the restricted internal passage 230 of valve 80. In normal operation, a pressure of about 25 pounds per square inch divides the flow approximately one-half to the cooler and one-half returning directly to the reservoir. The pressure required for this purpose is effected much less by change in oil viscosity, due to changes in temperatures than is normally the case where an orifice restrictor is employed to divide the flow. Accordingly, the pressures in the oil cooler will not be excessive in cold weather.

When the hydraulic fluid is cold and both of the valves are in the "hold" position as shown in Fig. 2, the majority of the hydraulic fluid will automatically bypass the cooler until it has warmed up to a point to where its viscosity is decreased and cooling of the oil is necessary.

As will be more clearly apparent from the further description of the operation of the system of the invention when either valve 80 or 82 is shifted to a working position flow of pressure fluid to the cooler and/or to the filter 90 are blocked and no hydraulic fluid passes to these structures. Accordingly, when pressure fluid is required to operate the cylinders 22 or 30 there is no loss of power through the cooler or through the filter and it has been found that sufficient cooling of the hydraulic fluid is obtained when the valves are in the "hold" position which takes place regularly during the working cycle of the machine.

Referring to Fig. 3 of the drawings, valve 82 controlling the flow of pressure fluid to the dump cylinders 30 is shown in the "hold" position while valve 80 which controls the flow of pressure fluid to the hoist cylinders 22 is in the "hoist" position. With the valves in these positions, pressure fluid from the pump 88 flows through conduit 194 to the inlet port 172 of valve 82. From valve 82 the pressure fluid flows from port 162 through conduit 198 to inlet port 132 of valve 80. Further, pressure fluid from port 172 of valve 82 flows past the spring-urged valve check 190 to port 174, thence through conduit 196 to port 152 of valve 80. The spring-urged check valve 152 remains in the closed position as the pressure fluid on each side thereof is the same and the spring will keep the valve closed.

Pressure fluid entering valve 80 through port 132 flows out of port 126 between spool control surfaces 140 and 142, thence through conduit 204 to ports 66 of rams 22 forcing the pistons and their piston rods in the direction of the directional arrows. Hydraulic fluid ahead of the pistons 62 flows out of ports 68 through conduit 206 into the valve 80 through port 128 thence out exhaust port 130 into conduits 210 and then to conduit 94 through which the hydraulic fluid is returned to the reservoir 84. It will be noted that when valve 80 is in the "hoist" position spool control surface 138 blocks the passage of pressure fluid to port valve 122 so that no pressure fluid flows to the cooler or the filter.

Referring to Fig. 4 of the drawings, valve 82 is also in the "hold" position while valve 80 is in the "float" position. With valve 82 in the "hold" position, pressure fluid is again directed to valve 80 from valve 82 through port 162, conduit 198 and into port 132 of valve 80. With valve 80 in the "float" position, the primary flow of pressure fluid through this valve is out the exhaust port 124 into conduit 94 through which it is returned to the reservoir 84. However, it will also be noted that conduits 204 and 206 which are connected to ports 126 and 128 of valve 80 are opened to the flow of hydraulic fluid returning to the reservoir 84 through internal ports in the valve conduits 94 and 210 whereby pressure fluid may flow in either direction in conduits 204 or 206 to either side of the pistons 62 of hydraulic rams 22 whereby the boom may seek the level of the ground and as the ground level shifts the boom and the bucket ride upwardly or downwardly, without the application of positive force in either direction. With the valve 80 in the "float" position the front end loading machine is available for use in smoothing a surface which is being worked and the like.

Referring specifically to Fig. 5 of the drawings, valve 82 is shown in the bucket "rollback" position and valve 80 is shown in the "hold" position. With valve 82 in the "rollback" position and valve 80 in the "hold" position, no pressure fluid is directed from the valve 82 to valve 80, and all of the pressure fluid from pump 88 passes through conduit 194 into port 172 of valve 82, thence past spring-urged control member 190, between spool control surfaces 180 and 182, thence out valve port 168 into conduit 202 to inlet port 78 of hydraulic rams 30 forcing the pistons in the direction of the directional arrows. Hydraulic fluid at the rear ends of the hydraulic rams 30 leaves the cylinders through ports 76, conduit 200 to port 166 of valve 82. From port 166 of valve 82 the return fluid flows between control surfaces 180 and 178 of spool 160 thence out port 164 and into conduit 96 through which the hydraulic fluid is returned to the reservoir 84.

Referring specifically to Fig. 6 of the drawings, valve 82 is in the "rollback" position and valve 80 is in the "float" position. With the valves in these positions, pressure fluid leaving pump 88 flows through conduit 194 to inlet port 172 of valve 82. From inlet port 172 of valve 82 the pressure fluid passes the spring-urged valve means 190 and all of the hydraulic fluid flows between spool control members 180 and 182, thence out of valve port 168 through conduit 202 to the forward ends of hydraulic rams 30 moving the pistons thereof in the direction of the directional arrows. The hydraulic fluid at the rearward ends of the pistons leaves the cylinders through ports 76, conduit 200 to the valve through valve port 166 and past spool control surfaces 180 and 178, thence out valve port 168 to reservoir 84 through conduit 96. None of the pressure fluid flows through valve 80; however, pressure fluid from either end of pistons 62 of hydraulic rams 20 may flow in conduits 204 and 206 about spool control surfaces 142, 140 and 138 as described with reference to Fig. 4 of the drawings.

Referring specifically to Fig. 7 of the drawings, valve 80 is in the "hoist" position and valve 82 is in the "dump" position. With the valves in these positions, pressure fluid from the pump 88 flows through conduit 194 into port 172 of valve 82. Pressure fluid entering port 172 of valve 82 flows past the spring-urged flow control valve 190 where a portion of the pressure fluid flows between spool control surfaces 182 and 180 to outlet port 166, thence into conduit 200 to inlet ports 76 of hydraulic rams 30 forcing the pistons in the direction of the directional arrows. Hydraulic fluid ahead of the pistons 72 flows out of the cylinders through ports 178 into conduit 202, thence to inlet port 168 of valve 82 about spool control surface 182, thence out port 170 to conduit 208 and conduit 96 which directs the return pressure fluid to the reservoir 84.

A portion of the pressure fluid flowing past the spring-urged control valve 190 passes from valve 82 through port 174 into conduit 196, thence to inlet port 152 of valve 80. From valve 80 this portion of the pressure fluid flows between spool control surfaces 142 and 140, thence out of port 126 and into conduit 204 to the rearward ends of hydraulic rams 22 forcing the pistons 62 in the direction of the directional arrows. Hydraulic fluid ahead of the pistons 62 leave the cylinders through ports 68 to flow into conduit 206 to inlet port 128 of valve 80 where the fluid flows about spool control surface 142, thence out port 130 to conduit 210, thence to conduit 94 where it is returned to the reservoir 84.

With both valves 80 and 82 in a working position as shown in Fig. 7, the pressure required to operate the hoist hydraulic rams 22 may be greater than that required to operate the dump hydraulic rams 30. If this condition arises and there is insufficient pressure fluid to operate the hoist rams while the dump rams are being actuated spring-urged flow control valve 152 will close preventing the bucket arm or boom 14 from dropping. The flow control valve 152 will remain in the closed position until sufficient pressure is built up within the system to operate the hoist rams 22.

Referring specifically to Fig. 8 of the drawings, valve 80 is in the bucket "lowering" position and valve 82 is in the "hold" position. With the valves in these positions, pressure fluid from pump 88 flows through conduit 194 to inlet port 172 of valve 80. The pressure fluid entering port 172 of valve 82 flows between spool control surfaces 178 and 176, thence through port 162 to conduit 198 where the pressure fluid is directed to inlet port 132 of valve 80. The pressure fluid entering valve 80 through inlet port 132 flows past spring-urged flow control valve 150 to flow between spool control surfaces 142 and 140 of spool 120, thence to outlet port 128 of valve 80 into conduit 206 whereas the pressure fluid is directed into inlet port 68 of hydraulic rams 22 moving the pistons 62 in the direction of the directional arrows.

Hydraulic fluid at the rear of the pistons flows out of ports 66 through conduit 204 to inlet port 126 of valve 80, thence between spool control surfaces 140 and 138, thence out port 124 and into conduit 94 which returns the hydraulic fluid to the reservoir 84.

When the bucket is being lowered as shown in Fig. 8 of the drawings, the load carried by the bucket may be great enough to cause the arm 14 to drop faster than the pump supply would normally allow. Under these conditions spring-urged flow control valve 154 will open permitting make-up hydraulic fluid to enter the system from return conduits 94 and 210 through port 130 in the valve, thus preventing cavitation.

Similarly, with reference to Fig. 7, if the dump cylinder should move faster than the pump supply would normally allow due to a particularly heavy load in the bucket pulling the dump cylinders over, make-up hydraulic fluid will be drawn into the system from the return side of the cylinders through spring-urged flow control valve 192, past valve port 170 from conduit 202.

It is further pointed out that spring-urged flow control valve 190 functions to prevent the bucket from dumping due to lack of pressure between the pump and control valve if the engine driving the pump 88 should fail when the valve 82 is in the "rollback" position and the bucket is up and loaded.

To complete the description and the operation of the circuitry of the invention, the spring-urged ball-check relief valve 144 of valve 80 and 184 of valve 82 are conventional relief valves and are preset at the time the valve is manufactured for maximum pressure and under overload conditions will relieve the pressure fluid flow to the return system.

The pressure fluid control system of the invention also includes ball-check type relief valves which protect the hoses, cylinders, valve spool and the like from excessive pressures and surges caused by shock loads and impact. Valve 80, as hereinbefore described, is provided with two such relief valves designated 146 and 148, while valve 82 is provided with corresponding relief valves 186 and 188. It will be seen that one of these relief valves 146, 148, 186 and 188 is provided for each conduit 204, 206, 200 and 202, respectively, and vents its respective conduit to a return line 94, 210, 96 or 208. Thus, for example, if a momentary overload should develop in conduit 204 while the hoist cylinders 22 are lifting the loaded bucket, the excessive pressure would force the ball of ball-check relief valve 146 away from its seat and pressure fluid would flow from conduit 204 into return line 94 until the overload condition is relieved.

Having fully described the new and improved hydraulic control system and specific examples of its use, what is claimed as our invention is:

1. In a pressure fluid control system for two motion devices operable simultaneously or selectively including a control valve having a movable flow control means for each motion device, a pump and a source of fluid, the combination comprising conduit means connecting one of the valves to the pressure side of the pump, conduit means connecting said one valve through its control means to one of the motion devices, conduit means connecting the other of said valves through its flow control means to the other of the motion devices, a first conduit connecting the pressure fluid in said one valve to the other valve through the flow control means of said one valve, and a second conduit connecting the pressure fluid in said one valve to said other valve and by-passing the flow control means in said one valve whereby said valves are connected in parallel to the pressure side of the pump and said other valve is selectively connected in series to the pressure fluid in said one valve through said flow control means of said one valve for actuating said other of the motion devices through said flow control means of said other valve.

2. In a pressure fluid control system for two motion devices operable simultaneously or selectively including a control valve having a movable flow control means for each motion device, a pump and a source of fluid, the combination comprising conduit means connecting one of the valves to the pressure side of the pump, conduit means connecting said one valve through its flow control means to one of the motion devices, conduit means connecting the other of said valves through its flow control means to the other of the motion devices, conduit means connecting said other of said valves through its flow control means to a pressure fluid cooler and to a reservoir, a first conduit connecting the pressure fluid in said one valve to the other valve through the flow control means of said one valve, a second conduit connecting the pressure fluid in said one valve to said other valve and by-passing the flow control means in said one valve, the connections between said valves, said motion devices and the pressure fluid cooler being so arranged that pressure fluid is directed to said pressure fluid cooler when the connections between said valves and their respective motion devices are blocked.

3. The invention defined in claim 2 wherein the connection between the pressure fluid cooler and said other valve includes a tortuous path and a flow restrictor whereby the portion of the pressure fluid flowing to the cooler is dependent upon the viscosity of the pressure fluid.

4. The invention defined in claim 1 including pressure responsive flow directing means in each of said valves for preventing the flow of pressure fluid from said motion devices to said valves upon a predetermined reduction in the pressure of the pressure fluid from said pump.

5. The invention defined in claim 1 including pressure responsive flow directing means in said system for directing return pressure fluid to said motion devices when the supply of pressure fluid from said pump is less than the demand of the motion devices.

6. The invention defined in claim 1 including pressure responsive flow diverting means in each of the conduits connecting the control valves to the motion devices to divert the flow of pressure fluid under overload conditions.

7. The invention defined in claim 6 wherein the pressure responsive flow diverting means provide connections between the motion devices and the suction side of said pump.

References Cited in the file of this patent

UNITED STATES PATENTS

| | | |
|---|---|---|
| 2,232,357 | Argo | Feb. 18, 1941 |
| 2,373,226 | Coates | Apr. 10, 1945 |
| 2,526,411 | Rathmann | Oct. 17, 1950 |
| 2,711,633 | Ford | June 28, 1955 |
| 2,745,357 | Strayer | May 15, 1956 |
| 2,768,499 | Pilch | Oct. 30, 1957 |
| 2,809,596 | Sullwold et al. | Oct. 15, 1957 |
| 2,831,466 | Stueland | Apr. 22, 1958 |

UNITED STATES PATENT OFFICE
CERTIFICATE OF CORRECTION

Patent No. 2,982,101

May 2, 1961

Theodore N. Hackett et al.

It is hereby certified that error appears in the above numbered patent requiring correction and that the said Letters Patent should read as corrected below.

Column 8, line 25, after "its" insert -- flow --.

Signed and sealed this 19th day of September 1961.

(SEAL)
Attest:

ERNEST W. SWIDER
Attesting Officer

DAVID L. LADD
Commissioner of Patents

USCOMM-DC